(12) United States Patent
Feiz

(10) Patent No.: US 10,934,940 B2
(45) Date of Patent: Mar. 2, 2021

(54) FUEL NOZZLE FLOW-DEVICE PATHWAYS

(71) Applicant: General Electric Company, Schenectady, NY (US)

(72) Inventor: Homayoon Feiz, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 154 days.

(21) Appl. No.: 16/215,935

(22) Filed: Dec. 11, 2018

(65) Prior Publication Data

US 2020/0182154 A1 Jun. 11, 2020

(51) Int. Cl.
*F23R 3/28* (2006.01)
*F02C 7/22* (2006.01)
*F23R 3/14* (2006.01)

(52) U.S. Cl.
CPC .............. *F02C 7/222* (2013.01); *F23R 3/283* (2013.01); *F23R 3/14* (2013.01); *F23R 3/286* (2013.01)

(58) Field of Classification Search
CPC .... F23R 3/14; F23R 3/28; F23R 3/283; F23R 3/286; F23R 3/34; F23R 3/346; F23R 3/36

See application file for complete search history.

(56) References Cited

U.S. PATENT DOCUMENTS

| | | | |
|---|---|---|---|
| 3,685,741 A * | 8/1972 | O'Sickey | F23D 11/24 239/406 |
| 4,843,816 A | 7/1989 | Kronogard et al. | |
| 5,577,385 A | 11/1996 | Kapich | |
| 6,289,676 B1 * | 9/2001 | Prociw | B05B 1/3489 60/740 |
| 6,357,237 B1 * | 3/2002 | Candy | F23D 11/36 60/737 |
| 6,718,770 B2 * | 4/2004 | Laing | F23D 11/36 239/548 |
| 8,037,690 B2 * | 10/2011 | Morenko | F02C 7/222 60/39.094 |
| 8,096,129 B2 * | 1/2012 | Francis | F02C 7/222 60/734 |
| 8,281,595 B2 * | 10/2012 | Davis, Jr. | F23D 14/82 60/737 |
| 8,432,048 B1 | 4/2013 | Paulino | |
| 8,904,796 B2 * | 12/2014 | Singh | F23R 3/045 60/733 |
| 10,125,991 B2 * | 11/2018 | Ramier | F23R 3/283 |
| 10,132,240 B2 * | 11/2018 | Ramier | F23D 11/108 |
| 10,234,142 B2 * | 3/2019 | Patel | F02C 7/22 |
| 10,364,751 B2 * | 7/2019 | Ryon | F02C 7/222 |
| 2008/0280238 A1 * | 11/2008 | Smith | F23R 3/286 431/9 |
| 2014/0013761 A1 * | 1/2014 | Pasqualotto | F23C 15/00 60/737 |
| 2014/0291418 A1 * | 10/2014 | Ruffing | F02C 7/232 239/403 |
| 2014/0366547 A1 | 12/2014 | Kraft et al. | |
| 2016/0186663 A1 * | 6/2016 | Stewart | F23R 3/286 60/737 |

(Continued)

*Primary Examiner* — William H Rodriguez
(74) *Attorney, Agent, or Firm* — Eversheds Sutherland (US) LLP

(57) ABSTRACT

The present application provides a combustor. The combustor may include a fuel supply line, a fuel nozzle, and a number of flow-device pathways connecting the fuel supply line and the fuel nozzle. The flow-device pathways may include a counter-swirl configuration.

12 Claims, 4 Drawing Sheets

(56) References Cited

U.S. PATENT DOCUMENTS

| | | | |
|---|---|---|---|
| 2016/0223201 A1* | 8/2016 | Zink | B05B 1/08 |
| 2016/0236215 A1* | 8/2016 | Ryon | F23R 3/04 |
| 2017/0191667 A1* | 7/2017 | Spivey | F23R 3/343 |
| 2017/0248318 A1* | 8/2017 | Kulkarni | F23R 3/14 |
| 2019/0376690 A1* | 12/2019 | Niemeyer | F23D 11/24 |

* cited by examiner

US 10,934,940 B2

FUEL NOZZLE FLOW-DEVICE PATHWAYS

TECHNICAL FIELD

The present application and the resultant patent relate generally to gas turbine engines and more particularly relate to fuel nozzles with modified flow-device pathways to reduce swirl therein so as to limit high thermal gradients and resultant thermal shock and deformation.

BACKGROUND OF THE INVENTION

Managing thermal gradients in a gas turbine engine assists in minimizing thermal shock and deformation. In combustors, for example, thermal shock may be amplified in certain components that are exposed to both hot air and cold fuel streams. Specifically, fuel nozzles may be exposed to hot air from the compressor discharge with temperatures in the order of about 1000° Fahrenheit (about 538° Celsius) or more at the outer fuel nozzle surfaces. In parallel, the unheated gas fuel stream may have much lower temperatures, in the range of about 80-140° Fahrenheit (about 27-60° Celsius), and may be fed from the gas lines to the combustor end-cover and inside the fuel nozzles. The fuel nozzle hardware within the combustor thus may be exposed to both air flows and fuel flows passing therethrough. As a result, fuel nozzles may experience thermal shocks and resultant deformation.

The amount of deformation may depend on the heating and cooling rates from the air and the fuel flows. Moreover, the position of the fuel nozzle or other component may have an impact. For example, the fuel flow may enter certain fuel nozzles in a tangential direction that may lead to a swirling flow within the base of the fuel nozzle. This swirling may create high velocity flows that lead to high heat transfer (cooling) rates at the base. This cooling may create a high thermal gradient between the inner base and the outer fuel nozzle surface. The thermal gradient may cause deformation that may lead to a gap between fuel nozzle and the endcover so as to cause the fuel to leak and cause undesired autoignition.

SUMMARY OF THE INVENTION

The present application and the resultant patent thus provide a combustor. The combustor may include a fuel supply line, a fuel nozzle, and a number of flow-devices with complex pathways connecting the fuel supply line and the fuel nozzle. The flow-device pathways may include a counter-swirl configuration.

The present application and the resultant patent further provide a method of operating a combustor with a flow of fuel. The method may include the steps of attaching a fuel nozzle to a fuel supply line at an angle by a number of flow-device pathways, flowing the fuel into the fuel nozzle with swirl therein, and attaching the flow-device pathways in a counter-swirl configuration to reduce the swirl therein.

The present application and the resultant patent further provide a combustor. The combustor may include a fuel supply line, a fuel nozzle, and a number of flow-device pathways connecting the fuel supply line and the fuel nozzle at an angle. The flow-device pathways may include a clockwise configuration.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
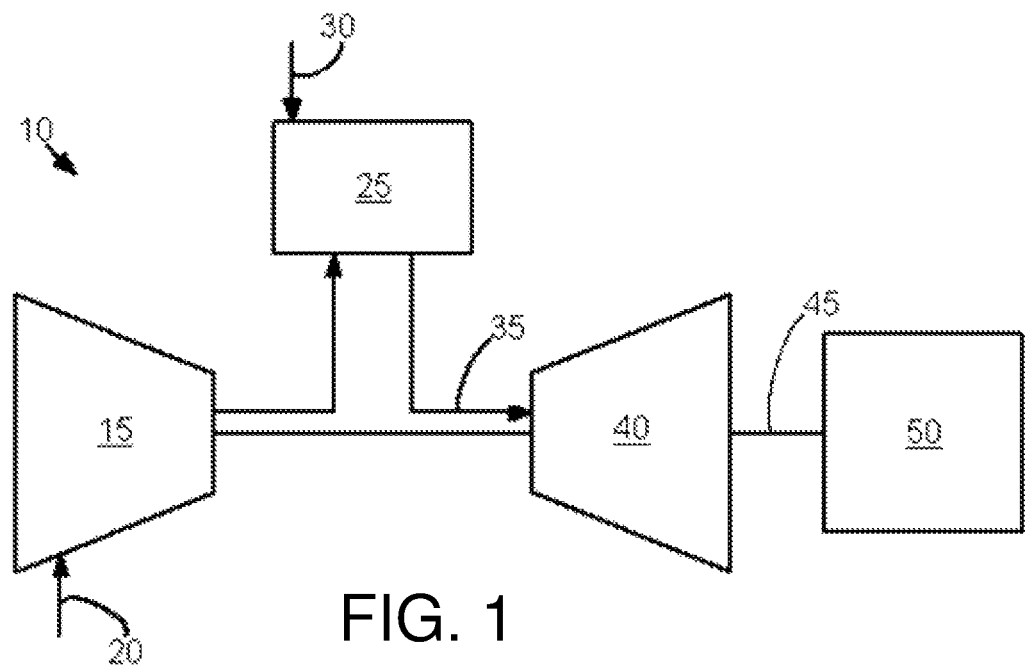
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25. The flow of the hot combustion gases 35 is in turn delivered to a turbine 40. The flow of the hot combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
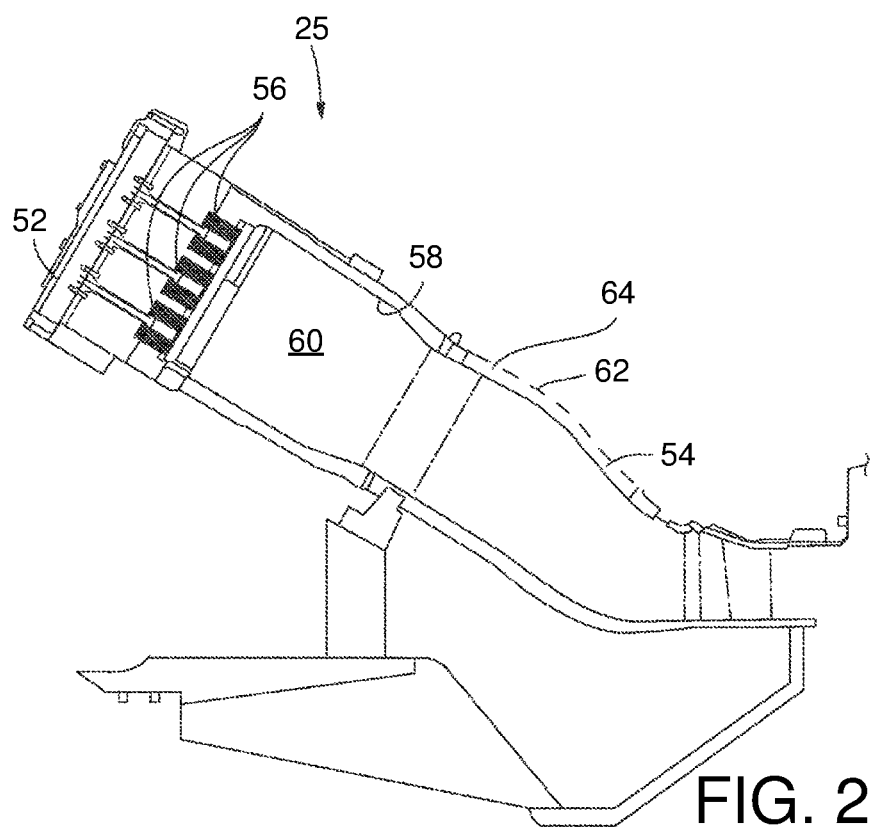
FIG. 2 is a schematic diagram of an example combustor.

FIG. 2 shows a schematic diagram of an example of a combustor can 25 as may be used with the gas turbine engine 10 described above and elsewhere. The combustor can 25 may extend from an end cap 52 at a head end to a transition piece 54 at an aft end about the turbine 40. A number of fuel nozzles 56 may be positioned about the end cap 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. The combustor can 25 described herein is for the purpose of example only. Combustor cans with other components and other configurations may be used herein.

Several types of known gas turbine engine designs, such as those using Dry Low NOx ("DLN") combustors, generally premix the flow of fuel and the flow of air upstream of a reaction or a combustion zone so as to reduce NOx emissions via a number of premixing fuel nozzles. Such premixing tends to reduce peak flame temperatures and, hence, NOx emissions.

Figure 3:
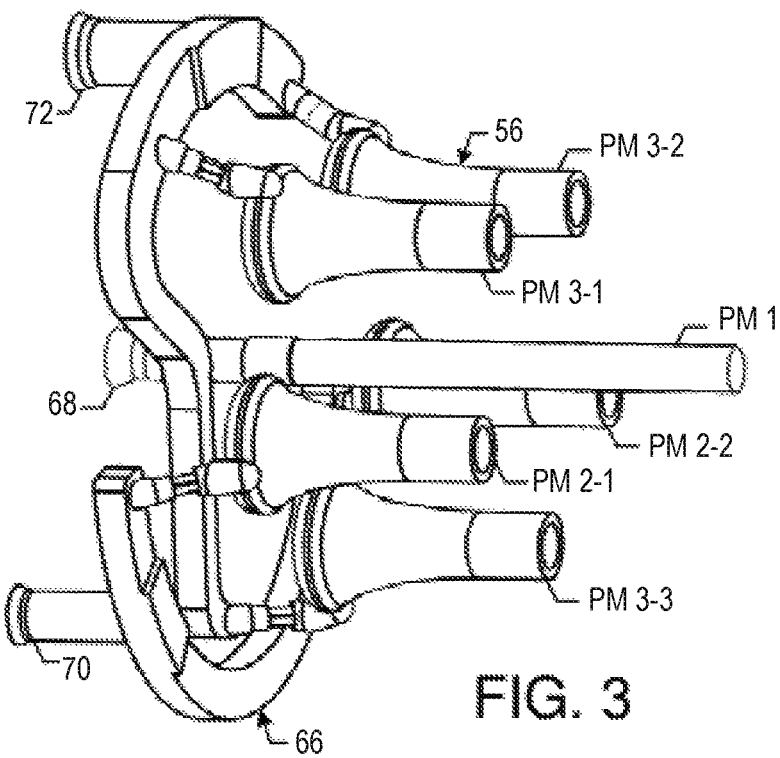
FIG. 3 is a perspective view of an example Dry Low NOx combustor

FIG. 3 shows an example of a DLN combustor can 66 as may be described herein. As is shown, multiple fuel nozzles 56 may be radially arranged around a single fuel nozzle 56. The fuel nozzles 56 may be divided into various groups or circuits so as to facilitate multiple fueling regimes over the range of gas turbine operations. For example, the center fuel nozzle 56 may define a primary fuel nozzle PM1 and may receive fuel from a first fuel supply line 68 while the surrounding outer fuel nozzles 56 may be grouped as secondary and/or tertiary fuel nozzle groups to receive the same or a different fuel from respective fuel supply lines 70, 72. Specifically, a secondary fuel nozzle group of two non-adjacent fuel nozzles PM2-1, PM2-2 may be supplied by the second fuel supply line 70 and a tertiary fuel nozzle group of three fuel nozzles PM3-1, PM3-2, PM3-3 may be supplied by the third fuel supply line 72. Each of the fuel nozzles 56 extends from the respective fuel supply line 68, 70, 72 by a number of straight flow-device passages 74.

Figure 4:
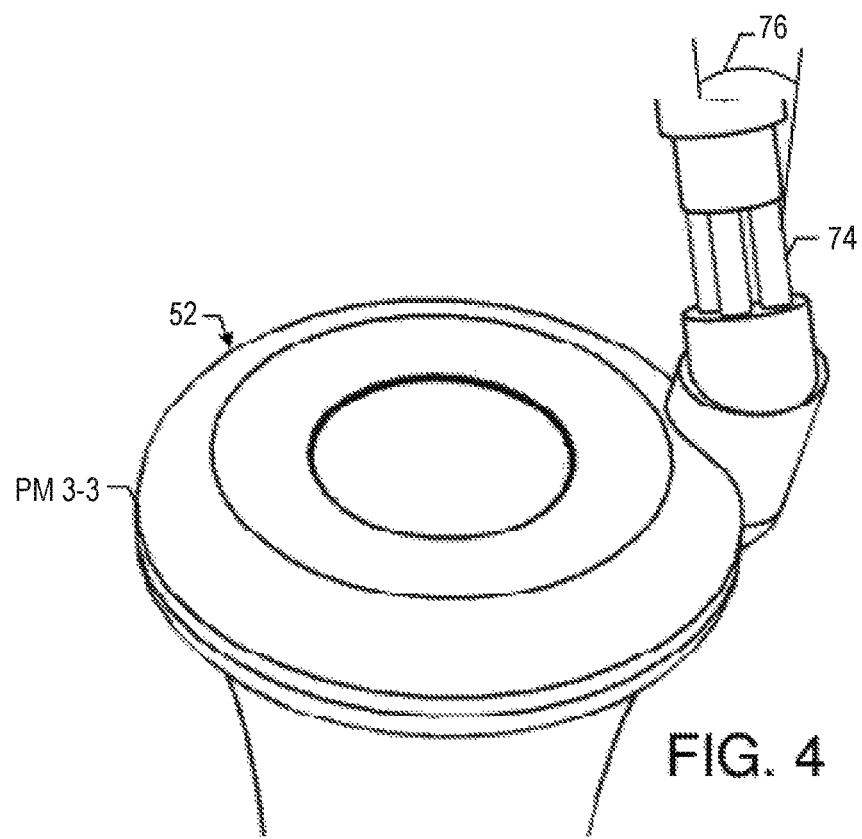
FIG. 4 is a perspective view of a number straight flow-device pathways attached to a PM3-3 fuel nozzle.
Figure 5:
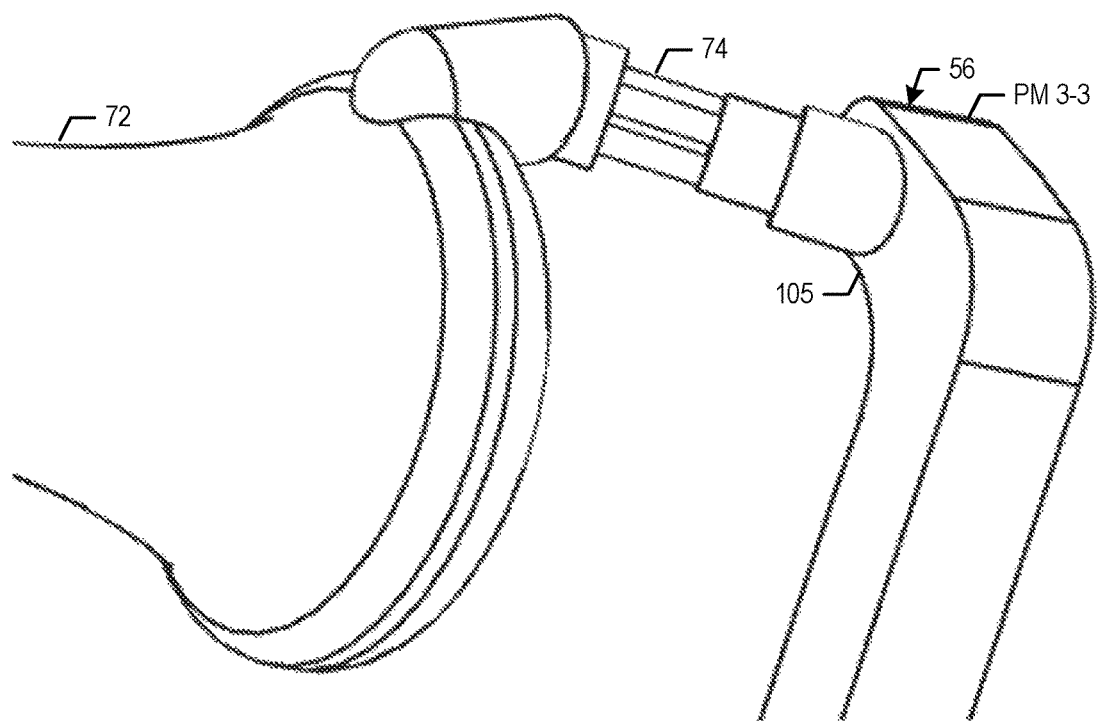
FIG. 5 is a further perspective view of a number straight flow-device pathways attached to a PM3-3 fuel nozzle.

Testing has shown that at least one of the fuel nozzles 56, PM3-3, may be subject to greater thermal shock and deformation than the others. As is shown in FIGS. 4 and 5, the flow-device passages 74 connect to the fuel nozzle PM3-3 tangentially at a yaw angle 76 due to its position within the combustor can 66. This yaw angle 76 may cause an undesired high swirl and high velocity in the fuel flow and, hence, excessive cooling rates and high thermal gradients.

Figure 6:
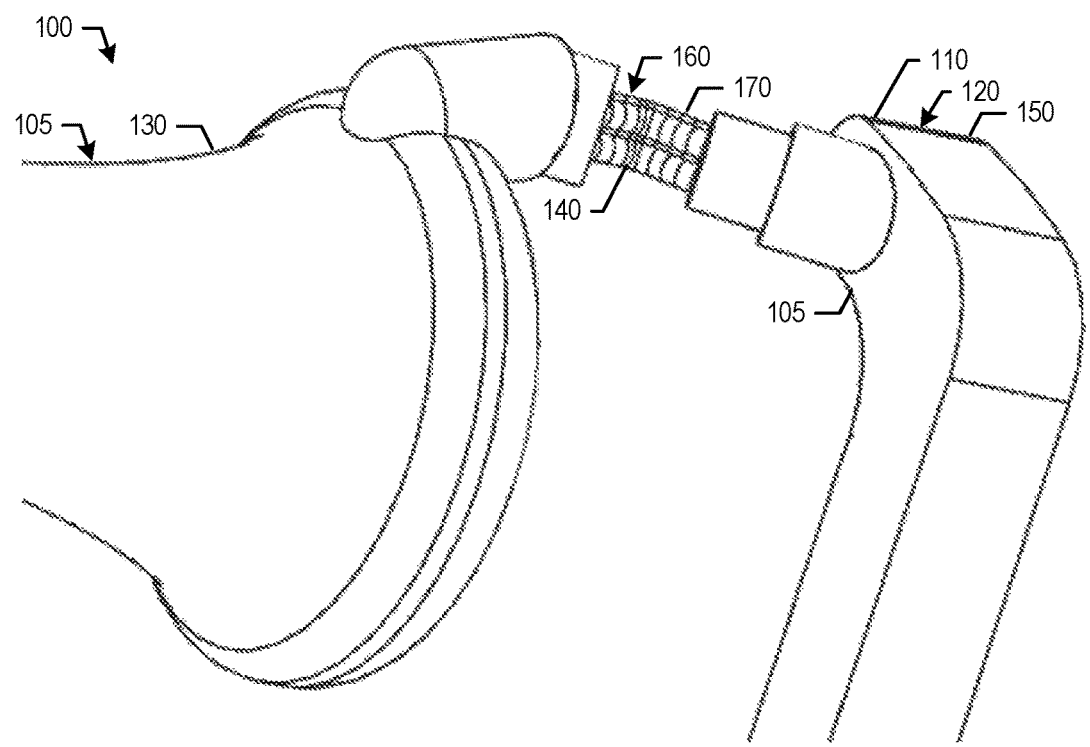
FIG. 6 is a perspective view of a number flow-device pathways with a curved configuration attached to a PM3-3 fuel nozzle as may be described herein.
Figure 7:
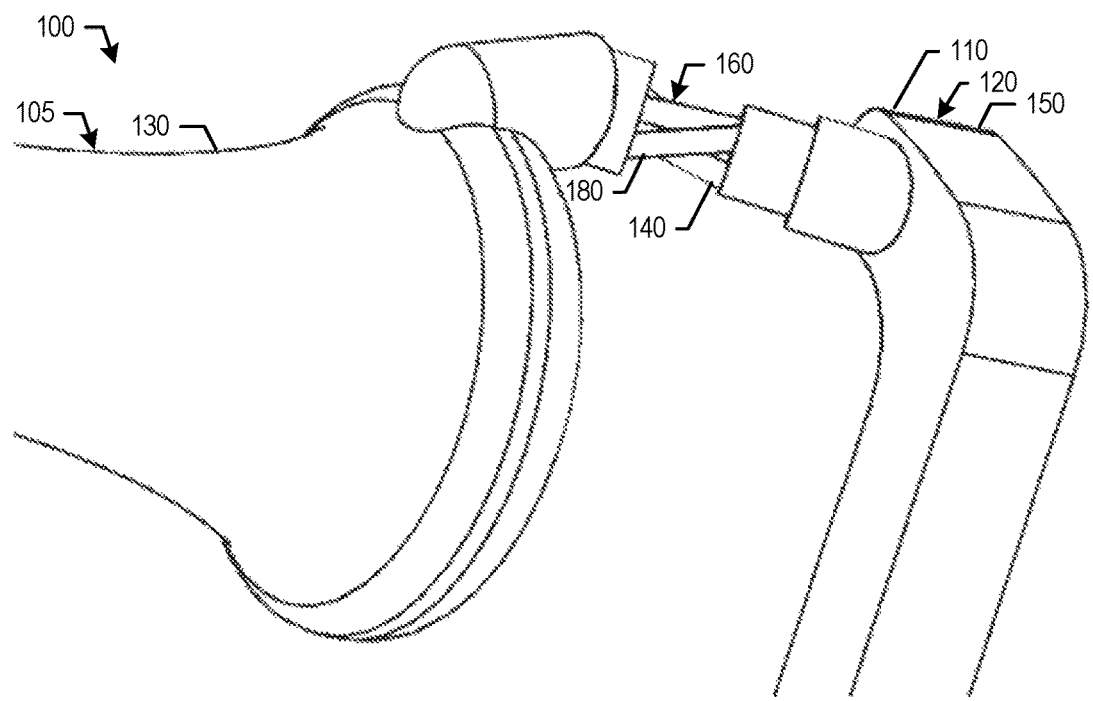
FIG. 7 is a perspective view of a number flow-device pathways with a counter-clockwise configuration attached to a PM3-3 fuel nozzle as may be described herein.
Figure 8:
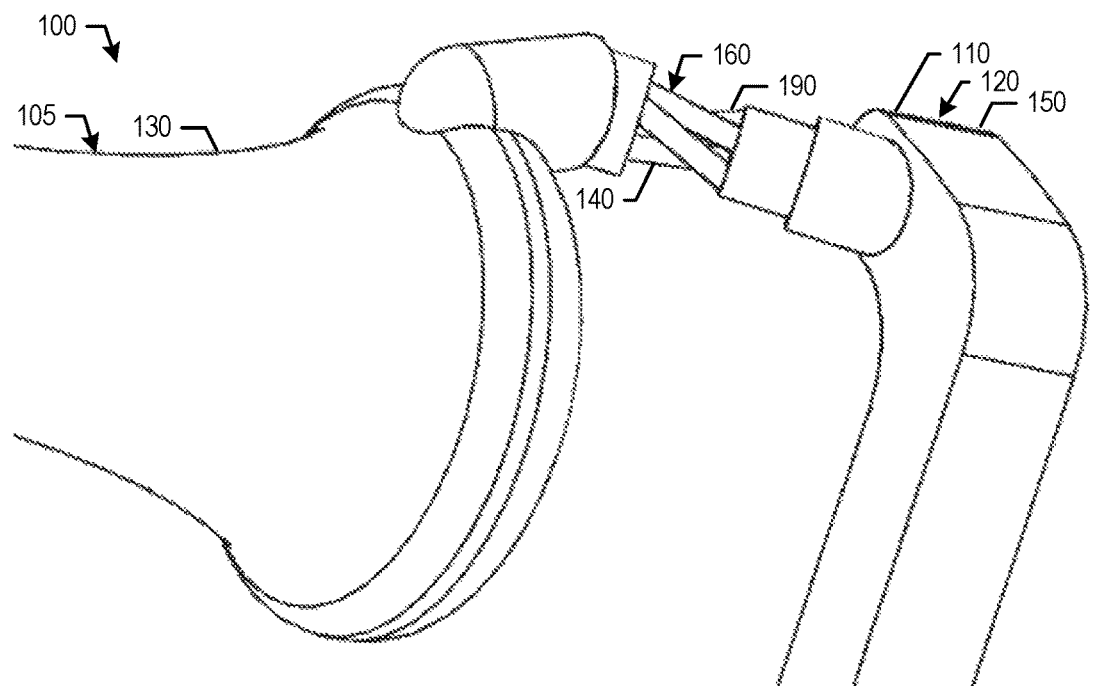
FIG. 8 is a perspective view of a number flow-device pathways with a clockwise configuration attached to a PM3-3 fuel nozzle as may be described herein.

FIGS. 6-8 show variations on portions of a combustor 100 as may be described herein. The combustor 100 may be a Dry Low NOx combustor 105. In each example, a base 110 of a fuel nozzle 120 is connected to a fuel supply line 130 by a number of flow-device passages 140. In this example the fuel nozzle 120 may be a tertiary premix PM3-3 fuel nozzle 150. Other types of fuel nozzles 120 may be used herein. Any of the flow-device passages 140 may be used herein. Other components and other configurations may be used herein.

As opposed to the straight flow-device passages 74 shown above, the flow-device passages 140 described herein may have a counter-swirl configuration 160. For example, FIG. 6 shows a number of flow-device passages 140 with a curved configuration 170. The curved configuration 170 may create a fuel flow 30 with high velocity but low swirl. FIG. 7 shows a number of flow-device passages 140 with a counter-clockwise configuration 180. The counter-clockwise configuration 180 may create a fuel flow 30 with high velocity but variable high-low swirl. FIG. 8 shows a number of flow-device passages 140 with a clockwise configuration 190. The clockwise configuration 190 may create a fuel flow 30 with low velocity and low swirl. The clockwise configuration 190 appears to generate a swirl in the opposite direction of the incoming flow such that the flow takes a largely straight path similar to the other fuel nozzles 120 with reduced velocity and thermal coefficients. Many other components and other configurations may be used herein. Specifically, any counter-swirl configuration 160 that reduces the overall swirl may be used herein.

The use of the counter-swirl configurations 160 thus introduces a counter-swirling flow to compensate for the existing swirl in the flow path. The counter-swirl configurations 160 straightens the flow so as to reduce the high thermal gradients and minimize the resultant thermal shock and deformation. Reducing thermal shock and deformation should reduce fuel nozzle leakage and mitigate the risk of nozzle base burning. This mitigation should reduce unplanned outages and improve overall component reliability and lifetime.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A combustor, comprising:
    a fuel supply line;
    a fuel nozzle; and
    a plurality of flow-device pathways connecting the fuel supply line and the fuel nozzle;
    wherein the plurality of flow-device pathways are tangentially connected to a base of the fuel nozzle at a yaw angle, which causes a swirl of fuel flow in the base of the fuel nozzle;
    wherein the plurality of flow-device pathways comprise a counter-swirl configuration relative to the swirl of fuel flow in the base of fuel nozzle to straighten the fuel flow so as to reduce thermal gradients and minimize thermal shock and deformation to the base of the fuel nozzle.

2. The combustor of claim 1, wherein the counter-swirl configuration comprises a curved configuration.

3. The combustor of claim 1, wherein the counter-swirl configuration comprises a counter-clockwise configuration.

4. The combustor of claim 1, wherein the counter-swirl configuration comprises a clockwise configuration.

5. The combustor of claim 1, further comprising a plurality of straight flow-device pathways.

6. The combustor of claim 1, wherein the combustor comprises a Dry Low NOx combustor.

7. A method of operating a combustor with a flow of fuel, comprising:
    attaching a base of a fuel nozzle to a fuel supply line at an angle by a plurality of flow-device pathways;
    flowing the fuel into the fuel nozzle with swirl therein; and
    attaching the plurality of flow-device pathways in a counter-swirl configuration relative to the swirl to reduce the swirl therein so as to reduce thermal gradients and minimize thermal shock and deformation to the base of the fuel nozzle.

8. A method of claim 7, wherein the step of attaching the plurality of flow-device pathways in a counter-swirl configuration comprises attaching the plurality of flow-device pathways in a curved configuration.

9. A method of claim 7, wherein the step of attaching the plurality of flow-device pathways in a counter-swirl configuration comprises attaching the plurality of flow-device pathways in a counter-clockwise configuration.

10. A method of claim 7, wherein the step of attaching the plurality of flow-device pathways in a counter-swirl configuration comprises attaching the plurality of flow-device pathways in a clockwise configuration.

11. A combustor, comprising:
a fuel supply line;
a fuel nozzle; and
a plurality of flow-device pathways connecting the fuel supply line and a base of the fuel nozzle at an angle, which causes a swirl of fuel flow in the base of the fuel nozzle;
wherein the plurality of flow-device pathways comprises a clockwise configuration relative to the swirl of fuel flow in the base of fuel nozzle to straighten the fuel flow so as to reduce thermal gradients and minimize thermal shock and deformation to the base of the fuel nozzle.

12. The combustor of claim 11, wherein the combustor comprises a Dry Low NOx combustor.

* * * * *